United States Patent [19]

Blaszuk

[11] Patent Number: 4,780,607
[45] Date of Patent: Oct. 25, 1988

[54] LASER BEAM POWER MONITORING ARRANGEMENT

[75] Inventor: Paul R. Blaszuk, Lebanon, Conn.

[73] Assignee: United Technologies Corporation, Hartford, Conn.

[21] Appl. No.: 88,777

[22] Filed: Aug. 24, 1987

[51] Int. Cl.[4] .............................................. H01J 3/14
[52] U.S. Cl. .................................... 250/216; 356/222; 219/121.6
[58] Field of Search ............... 356/222, 225, 218, 448; 250/216; 219/122 LA, 122 LB

[56] References Cited

U.S. PATENT DOCUMENTS

| | | | |
|---|---|---|---|
| 4,035,088 | 7/1977 | Jenkins et al. | 356/218 |
| 4,242,581 | 12/1980 | Crow | 356/222 |
| 4,260,255 | 4/1981 | Wachs et al. | 356/222 |
| 4,720,618 | 1/1988 | Stamer et al. | 219/121 LA |

Primary Examiner—David C. Nelms
Assistant Examiner—Jessica L. Ruoff
Attorney, Agent, or Firm—Peter R. Ruzek

[57] ABSTRACT

A monitoring arrangement monitors the power of a light beam which travels in a predetermined path between a laser and a destination location and is reflected at a predetermined location of the path from a reflecting surface of a deflecting mirror, with attendant inherent light scattering into a space portion. The monitoring arrangement includes at least one sensor situated in a space portion having the reflecting surface and imaginary extensions thereof for its boundary and including the predetermined path. The sensor is located between a reflected portion of the light beam and the boundary, preferably close to the boundary, to intercept and sense scattered light reaching it, especially forward-scattered light of the original laser beam, and generates a signal representative of the intensity of such intercepted scattered light. This signal is then evaluated. At least one additional sensor may be situated in the space portion between the incident portion of the original laser beam and the boundary to intercept and sense scattered light reaching it, which is primarily constituted by forward-scattered light of a return light beam that travels substantially in the predetermined path back to the laser after reflection at the destination location.

4 Claims, 2 Drawing Sheets

LASER BEAM POWER MONITORING ARRANGEMENT

DESCRIPTION

1. Technical Field

The present invention relates to laser beam monitoring equipment in general, and more particularly to an arrangement for monitoring the intensity of laser light.

2. Background Art

There are already known various arrangements for monitoring or sensing the intensity or power of a laser beam, among them such which measure the intensity of at least a portion of the laser beam, or of laser light that is scattered by a transparent or reflective object during passage of the laser beam through or reflection of the laser beam from such object.

So, for instance, it is known to direct a laser beam of a high-power $CO_2$ laser into a water calorimeter which absorbs the total laser beam power. Measurement of the increase in the heat contents of the calorimeter then yields an indication of the absorbed heat and hence of the laser beam power. This approach has a severe drawback in that the laser beam cannot be used for any other purposes, such as welding, while its power is being measured.

These considerations are also applicable, for instance, to laser beam sampling meters disclosed in the U.S. Pat. Nos. 4,035,088 and 4,260,255 where the laser beam whose power is to be measured passes through a rotating sampling wheel having spokes constituted by reflective knife edge blades which reflect the laser beam as they pass therethrough to a concave mirror that concentrates the deflected laser beam to a sensor. Even here, the propagation of the laser beam to its intended primary destination, such as to a workpiece to be welded, is interrupted by the blades at relatively frequent intervals and the laser beam power diverted to the sensor during such interruptions is lost for the intended primary purpose.

Even though it would be possible to avoid this disadvantage by diverting only a spatial portion of the laser beam to the calorimeter or another sensor while continuing to use the remainder of the laser beam for its intended purpose, the effective laser beam power would again be reduced by this diversion. Furthermore, it would be difficult, at least under some circumstances, to assure that the power of the diverted portion of the laser beam is truly representative of the power of the remainder of the laser beam.

At least the first one of these last-mentioned disadvantages is encountered in the laser energy monitor of the U.S. Pat. No. 4,242,581 where the laser beam passes on its way to its primary destination through a transparent plate which, because of its inherent imperfections, scatters some of the laser beam light passing through the plate in all directions, including radially of the plate. A plurality of sensors is distributed about the peripheral portion of the plate and senses the radially scattered radiation. It will be realized that the very presence of this plate as an additional element in the path of the laser beam reduces the effective power of the laser beam at its destination, because of the omindirectional scattering and, in most instances, even some reflection, of the laser light. This situation is even more aggravated by the fact that the sensors capture only a relatively small proportion of the scattered and/or reflected radiation, so that the effective power of the laser beam is reduced by much more than is needed for the actual sensing or measuring.

It has also been proposed to measure the laser beam power by sensing the intensity of light scattered by a deflection mirror constituting a required component of the optics of the laser arrangement in a direction normal to the plane of the deflection mirror. While this solution avoids introducing any additional elements into the optical train, it has been established that it still leaves much to be desired in terms of accuracy of measurement, especially since the measurement results are influenced to a considerable degree by light scatter from a return light beam that has been reflected from the workpiece and travels back to the laser, and the system is incapable of distinguishing between the scattered light from the original laser beam and that from the return light beam.

Accordingly, it is a general object of the present invention to avoid the disadvantages of the prior art.

More particularly, it is an object of the present invention to develop an arrangement for measuring or monitoring the power of a laser beam, which arrangement does not possess the disadvantages of the known arrangements of this type.

Still another object of the present invention is to construct the arrangement of the type here under consideration in such a manner as to be able to distinguish between the light scattered from the original laser beam and that from the return light beam.

It is yet another object of the present invention to provide an arrangement of the above type which is capable of measuring the power of the return light beam separately and independently from that of the original laser beam.

A concomitant object of the present invention is to design the above arrangement in such a manner as to be relatively simple in construction, inexpensive to manufacture, easy to use, and reliable in operation nevertheless.

Disclosure of the Invention

The above objects and others which will become apparent hereafter are achieved by an arrangement for monitoring the power of a light beam which travels in a predetermined path between a laser and a destination location and is reflected at a predetermined location of the path from a reflecting surface of a deflecting mirror having a normal extending at a predetermined acute angle of incidence with respect to an incident portion of the light beam and at an identical acute angle of reflection with respect to a reflected portion of the light beam, with attendant inherent light scattering into a space portion having the reflecting surface and imaginary extensions thereof for its boundary and including the predetermined path. This monitoring arrangement includes at least one sensor situated in the space portion between the reflected portion of the light beam and the boundary and operative for intercepting and sensing scattered light reaching the same and generating a signal representative of the intensity of such intercepted scattered light; and means for evaluating the signal. The sensor is advantageously situated in the proximity of the boundary to intercept primarily forward-scattered light.

The light beam may advantageously be the original laser beam issued by the laser. Then, the monitoring arrangement may further include at least one additional sensor situated in the space portion between the incident portion of the original laser beam and the boundary and operative for intercepting and sensing scattered light reaching the same and generating an additional signal representative of the intensity of such intercepted scattered light, and the evaluating means is also operative for evaluating the additional signal. It is particularly advantageous when the additional sensor is situated in the proximity of the boundary to intercept primarily forward-scattered light of a return light beam that travels substantially in the predetermined path from the destination location to the laser after having been reflected back at the destination location.

A particular advantage of the monitoring arrangement of the present invention is that the signal of the sensor or of each of the sensors is representative predominantly of the forward-scattered light as considered in the particular propagation direction of the light beam and that the back-scattered light has only a minuscule or negligible influence on this signal. This renders it possible to monitor the power of the respective light beam, be it the original laser beam or the reflected return light beam, separately and independently of the respective other light beam, and thus to distinguish between the powers of such original and return light beams.

BRIEF DESCRIPTION OF THE DRAWING

The present invention will be described in detail below with reference to the accompanying drawing in which.

BEST MODE FOR CARRYING OUT THE INVENTION

Figure 1:
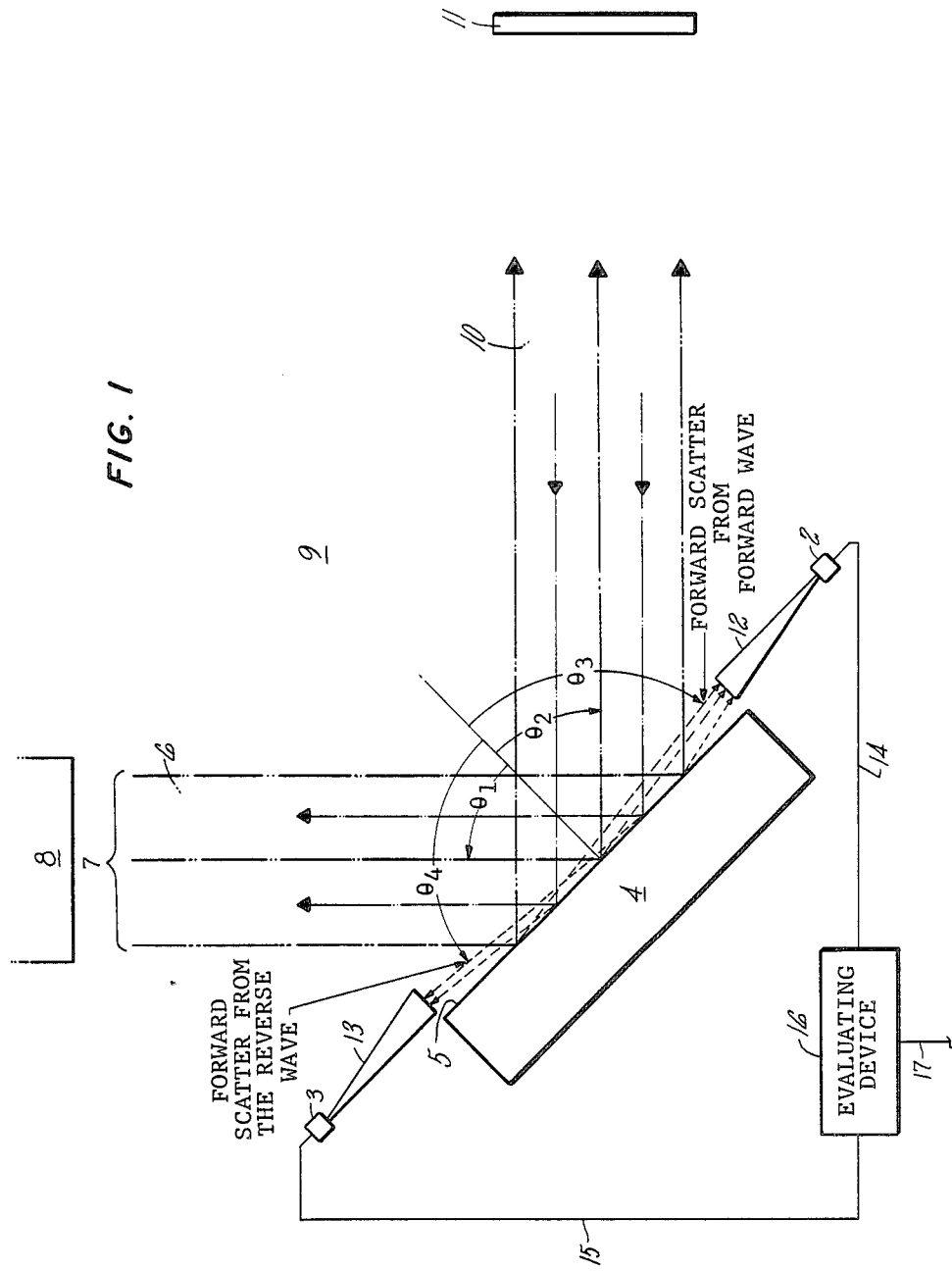
FIG. 1 is a somewhat diagrammatic side elevational view of a monitoring arrangement of the present invention as used in conjunction with a planar deflecting mirror extending at an angle of 45° with respect to a propagation direction of a laser beam.

Referring now to the drawing in detail, and first to FIG. 1 thereof, it may be seen that the reference numeral 1 has been used therein to identify a monitoring arrangement of the present invention in its entirety. In the illustrated situation, the monitoring arrangement 1 includes two sensors or detectors 2 and 3 which are situated close to a deflecting mirror 4. The deflecting mirror 4 has a reflecting surface 5 which is shown to be planar and to extend at such an angle with respect to an upstream or incident portion 6 of a laser beam 7 issued by a laser 8 that a normal to this reflecting surface 5 includes an angle $\theta_1$ of incidence amounting to about 45° with the incident laser beam portion 6. However, the present invention can equally well be used in conjunction with mirrors having reflecting surfaces of other shapes, such as part-spherical, part-cylindrical and the like.

After reflection from the reflecting surface 5 of the deflecting mirror 4, which is accompanied by omnidirectional light scattering into a space portion 9 having the reflecting surface 5 and its imaginary extensions as its boundary, the non-scattered remainder or downstream or reflected portion 10 of the laser beam 7 continues to propagate toward its ultimate destination, such as a welding location at which the laser beam is to weld respective workpieces, as indicated by an arrow 11, at an angle $\theta_2$ of specular reflection relative to the normal to the reflecting surface 5, which is identical to the angle $\theta_1$ of incidence, or about 45° in the illustrated situation.

The sensors 2 and 3 are shown to be disposed at such locations within the space portion 9 as to intercept and sense scattered light that propagates relatively close to the reflecting surface 5 and thus to the aforementioned boundary. This scattered light is constituted predominantly if not exclusively by forward scatter from the reflecting surface 5 for the particular direction of propagation of the light beam 7. Thus, for the detector or sensor 2, the intercepted radiation is at least primarily the forward-scattered light of the original laser beam 7, while the radiation intercepted by the detector or sensor 3 is primarily the forward-scattered light of a return light beam which propagates from the destination 11 back to the laser 8 substantially in the same path as the original laser beam 7 after having been reflected from the workpiece or the like at the destination 11. It may be seen in FIG. 1 of the drawing that this forward-scattered light propagates at a respective angle $\theta_3$ or $\theta_4$, which is close to 90°, relative to the normal to the reflecting surface 5, to reach the respective sensor or detector 2 or 3.

Figure 2:
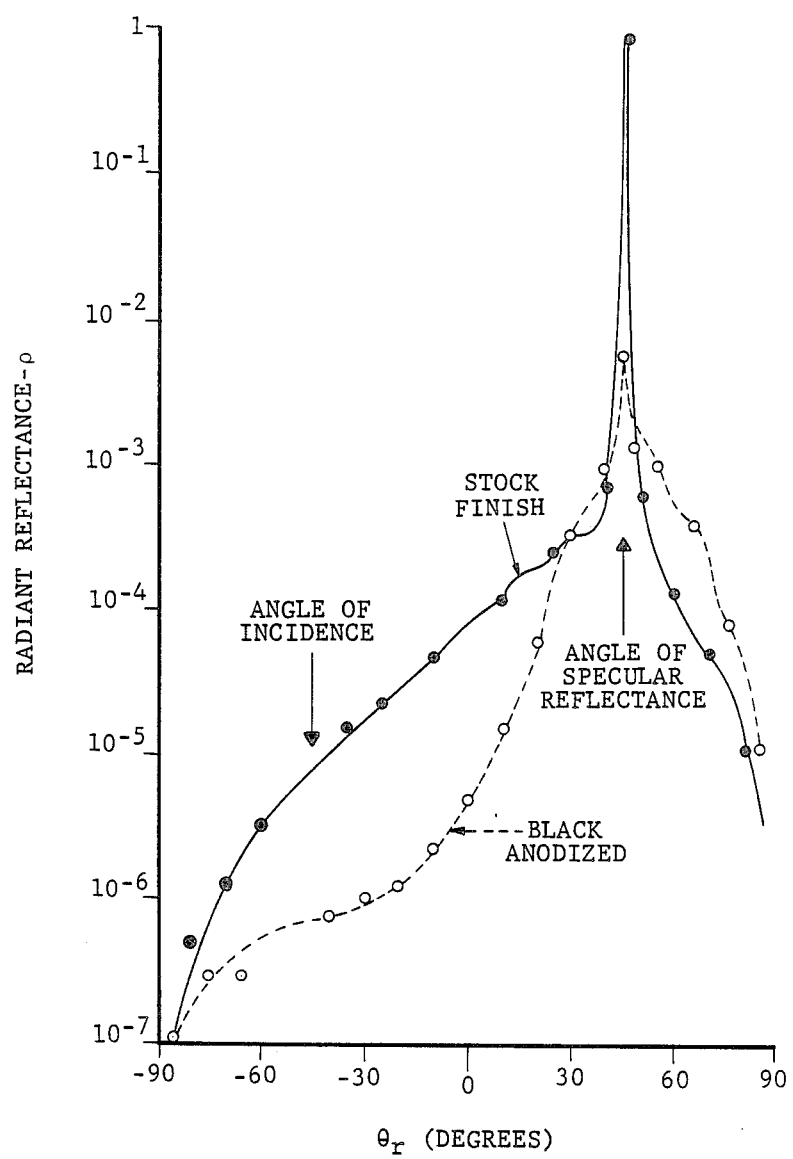
FIG. 2 is a graphic representation of the dependence of the radiant reflectances of two differently treated reflecting surfaces of the deflecting mirror of FIG. 1 on the angle of incidence of the laser beam.

The reason for this will become apparent upon consideration of FIG. 2 or the drawing, which shows the distribution of the radiant reflectance at 10.6 microns for aluminum mirrors with two different surface finishes, with the angle of incidence of the light being about −45°. It may be seen there that the reflectance for back scattering close to −90° is orders of magnitude smaller than the reflectance for forward-scattering close to +90°. Thus, by strategically locating each of the detectors or sensors 2 and 3 at its position indicated in FIG. 1 of the drawing, it was possible to assure that the scattered light reaching the respective sensor 2 or 3 will be predominatly the forward-scattered light from the light beam of interest and that the back-scatter from the respective other light beam will have only a negligible, if any, influence on the measurement results.

Turning now back to FIG. 1 of the drawing, it may also be seen there that each of the detectors 2 and 3 is shown to be equipped with a respective horn antenna 12 or 13. However, such detectors 2 and 3 could also be equipped with properly apertured lens systems instead, as is well known in the art.

It is also shown in FIG. 1 that the output signals of the detectors or sensors 2 and 3 are supplied through respective lines 14 and 15 to an evaluating device 16 which has at least one output 17 on which the evaluation result appears. The evaluating device 16 is of any known construction capable of processing the incoming signals in such a manner as to present them in a human-readable or otherwise human-discernible form. In its simplest implementation, the evaluating device 16 will include indicators or numeric displays for the values of the incoming signals, and/or warning lights or other alerts to call the attention of the operating personnel, and/or automatic switches for discontinuing the laser operation in the event of a potential overload or other operating hazards.

It may be seen from the above explanation that the present invention proposes a novel approach to the measurement of light beam power by sensing the intensity of scattered light. This approach allows the measurement of the power in the forward wave (wave traveling from the laser to the workpiece), as well as in the reverse or return wave (wave traveling from the ultimate destination, such as a workpiece being welded, back to the laser). It will be appreciated that the knowledge of the power of this reverse wave will be useful in performing the diagnostics of the laser beam/plasma/workpiece interaction.

It will be understood that the arrangement of the present invention could be operated merely as a monitor for the power of the original laser beam 7. In this case, the detector 3 and the associated circuitry could be dispensed with. Yet, this modified arrangement would still have the advantage of being relatively insensitive to the scatter from the return wave. By the same token, this arrangement could be operated solely with the detector 3 to measure only the power of the return beam, with the same advantage. However, when the arrangement uses both of the detectors 2 and 3, it becomes an invaluable tool for performing diagonstics of the interaction of the laser beam 7 with the workpiece being welded and with the plasma present at the welding region, in dependence on the power of the laser beam 7.

Moreover, the reflected wave detector 3 also provides a useful safety feature in the event of a strong light feedback from a workpiece to the laser 8. It has been established that such a strong feedback could initiate a high-Q cavity operation of the laser 8 and the external optical train. Such a high-Q cavity operation could result in damage to the laser due to workpiece reflections re-entering the laser in the reverse direction with attendant damage to the oscillator section, or to the optical train.

It should be understood that the invention is not limited to the particular embodiment shown and described herein, but that various changes and modifications may be made without departing from the spirit or scope of the concept as defined by the following claims.

I claim:

1. An arrangement for monitoring the power of a light beam which travels in a predetermined path between a laser and a destination location and is reflected at a predetermined location of the path from a reflecting surface of a deflecting mirror having a normal extending at a predetermined acute angle of incidence with respect to an incident portion of the light beam and at an identical acute angle of reflection with respect to a reflected portion of the light beam, with attendant inherent light scattering into a space portion having the reflecting surface and imaginary extensions thereof for its boundary and including the predetermined path, comprising
   at least one sensor situated in the space portion between the reflected portion of the light beam and the boundary and operative for intercepting and sensing scattered light reaching the same and generating a signal representative of the intensity of such intercepted scattered light; and
   means for evaluating said signal.

2. The arrangement as defined in claim 1, wherein said sensor is situated in the proximity of the boundary to intercept primarily forward-scattered light.

3. the arrangement as defined in claim 1, wherein the light beam is the original laser beam issued by the laser; and further comprising at least one additional sensor situated in the space portion between the incident portion of the original laser beam and the boundary and operative for intercepting and sensing scattered light reaching the same and generating an additional signal representative of the intensity of such intercepted scattered light; and wherein said evaluating means is also operative for evaluating said additional signal.

4. The arrangement as defined in claim 3, wherein said additional sensor is situated in the proximity of the boundary to intercept primarily forward-scattered light of a return light beam that travels substantially in the predetermined path from the destination location to the laser after having been reflected back at the destination location.

* * * * *